United States Patent [19]

Fukatsu et al.

[11] Patent Number: 4,595,866
[45] Date of Patent: Jun. 17, 1986

[54] WINDSHIELD WIPER CONTROL APPARATUS

[75] Inventors: Yoshiaki Fukatsu, Nagoya; Takashi Kurahashi, Aichi; Kazuma Matsui, Toyohashi, all of Japan

[73] Assignee: Nippondenso Co., Ltd., Kariya, Japan

[21] Appl. No.: 665,157

[22] Filed: Oct. 26, 1984

[30] Foreign Application Priority Data

Oct. 27, 1983 [JP] Japan .................................. 58-202426
Oct. 27, 1983 [JP] Japan .................................. 58-202427
Oct. 27, 1983 [JP] Japan .................................. 58-202428

[51] Int. Cl.$^4$ .......................... B60S 1/08; H02P 1/04
[52] U.S. Cl. ................................ 318/444; 318/313; 318/480; 318/483; 318/DIG. 2; 15/250 C
[58] Field of Search ............... 318/313, 443, 444, 480, 318/483, DIG. 2; 15/250 C

[56] References Cited

U.S. PATENT DOCUMENTS 4,355,271 10/1982 Noack .................................. 318/480
4,476,419 10/1984 Fukatsu et al. ..................... 318/444

FOREIGN PATENT DOCUMENTS 58-156439 9/1983 Japan .................................. 318/443

Primary Examiner—William M. Shoop, Jr.
Assistant Examiner—Bentsu Ro
Attorney, Agent, or Firm—Cushman, Darby & Cushman

[57] ABSTRACT

An automotive wiper control apparatus has an infrared emitting unit outside an occupant compartment, a photodetector unit inside the compartment in optical alignment with the infrared emitting unit, and an electric control for automatically controlling the wiper operation in dependence on the state in which infrared rays emitted by the infrared emitting unit through a predetermined area of the windshield are received by the photodetector unit. The photodetector unit has an infrared transmission plate formed of an infrared transmissive material and carrying infrared shielding layers applied in a striped pattern to one surface of the plate. The infrared transmission plate is disposed in front of a plurality of photodetectors so that a contrast is produced on the photodetectors by the infrared rays passing through the uncoated zones of the plate which are free from the infrared shielding layers. The contrast is varied with variation in the quantity of raindrops on the predetermined area of the windshield. The electrical control is responsive to the variation in the contrast to automatically control speed of wiper operation as well as intervals of intermittent wiper operations.

3 Claims, 11 Drawing Figures

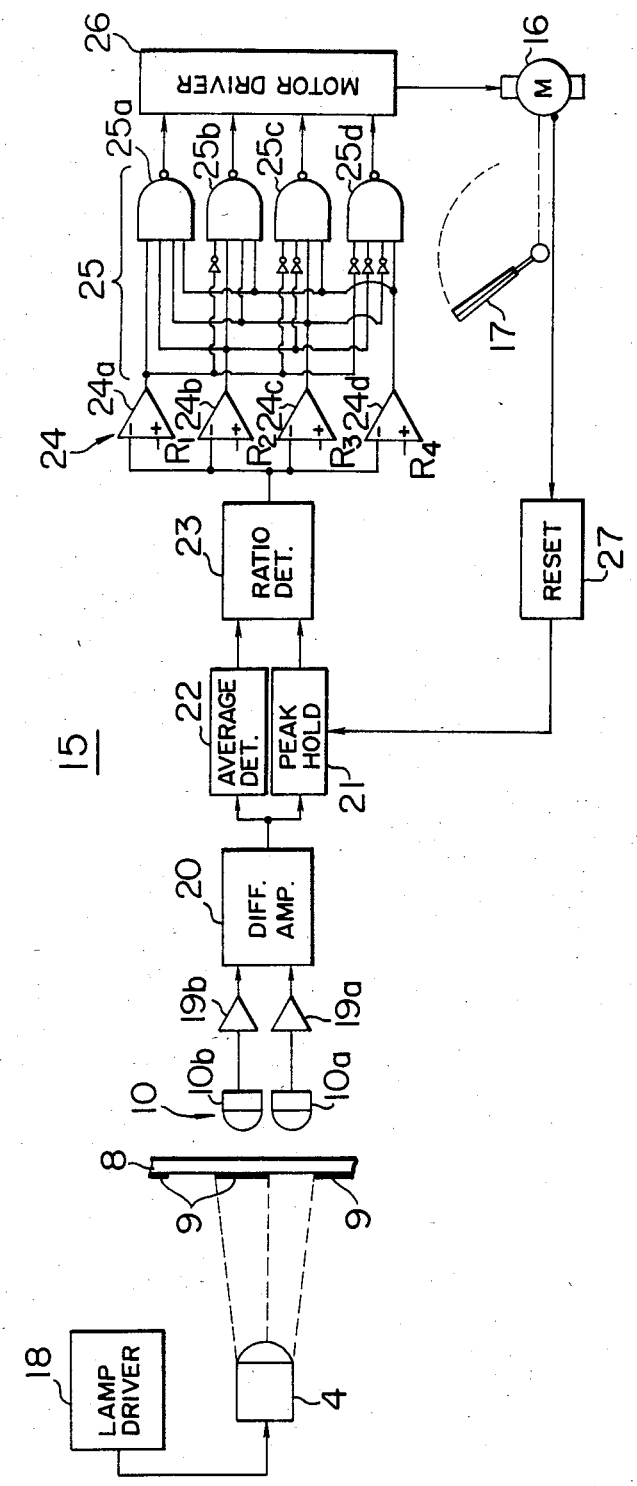
F I G. 4

WINDSHIELD WIPER CONTROL APPARATUS

CROSS REFERENCE TO RELATED APPLICATION

The present application is related to earlier application Ser. No. 499,405 filed May 31, 1983 in the names of Fukatsu et al. and entitled "WINDSHIELD WIPER CONTROL DEVICE", which issued as U.S. Pat. No. 4,476,419. The disclosure in the earlier application is incorporated herein by reference.

BACKGROUND OF THE INVENTION

The present invention relates to an apparatus for controlling a windshield wiper of a vehicle and, more particularly, to a windshield wiper control apparatus for automatically controlling the speed of the wiper operation and the intervals of intermittent cyclical wiper operation to give a driver a clear view to thereby assure a safety vehicle operation and an economical wiper operation.

The inventors of the present application have been engaged in the development of windshield wiper control apparatus for use on a vehicle which includes a light-emitting unit adapted to be mounted on the vehicle outside the occupant compartment, a light-receiving unit adapted to be mounted on the vehicle in the compartment for receiving the rays of the light emitted by the light-emitting unit and passed through a predetermined area of the windshield and control means responsive to the rays received by the light-receiving unit to judge the quantity of raindrops on the windshield for thereby automatically controlling the wiper operation.

The apparatus further includes an infrared transmission filter for reflecting visible light and a slit or masking plate having light-transmission slits and light-shielding zones arranged on the plate in a striped pattern. The filter and the slit plate are disposed both at the front portion of the light-receiving unit. The existence of these two elements, i.e., the filter and the slit plate, not only leads to the increase in the steps of assembling component parts of the unit but also complicates the structure thereof. In addition, in the case where the filter is placed in front of the slit plate so as to facilitate easy removal of dust, visible light is reflected by the outer surface of the filter plate, which will possibly spoil the front view of the windshield of the associated vehicle.

SUMMARY OF THE INVENTION

The present invention has its object to provide an improved windshield wiper control apparatus of the class specified above and in which the light-receiving unit has a simplified structure and will not spoil the front view of the windshield of the vehicle.

The light-receiving unit of the windshield wiper control apparatus according to the present invention has a single infrared transmission plate which provides both of infrared transmission and masking functions. The infrared transmission plate carries coatings of infrared shielding material applied in a striped pattern to at least one of the two surfaces of the plate. The light-receiving unit also has photodetector means operative to detect the contrast between the infrared rays which have passed through the infrared shielding coatings on the infrared transmission plate and through the uncoated zones thereof.

The above and other objects, features and advantages of the present invention will be more apparent by the following description with reference to the accompanying drawings.

BRIEF DESCRIPTION OF THE DRAWINGS

FIG. 4 is a block diagram of the electric circuitry employed in the control apparatus;

DESCRIPTION OF THE PREFERRED EMBODIMENTS

Figure 1:
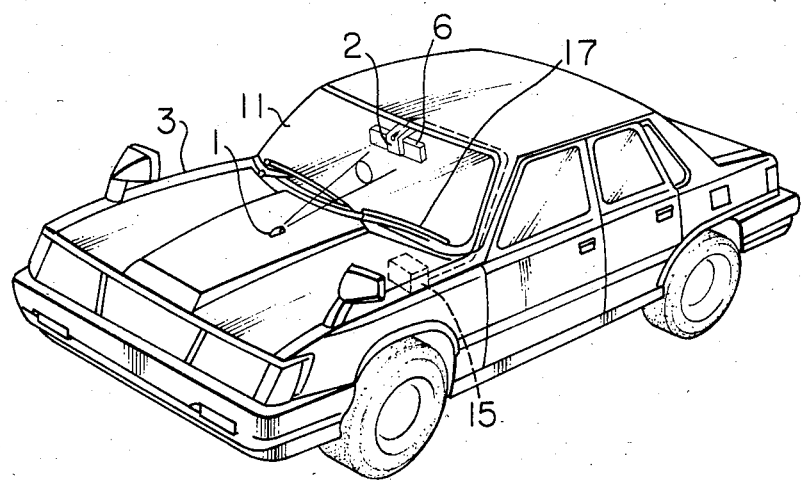
FIG. 1 is a perspective view of a vehicle equipped with an embodiment of a windshield wiper control apparatus according to the present invention.

Referring first to FIG. 1 of the drawings, a light-emitting unit 1 is mounted on an engine hood of a vehicle 3 and is positioned on the longitudinal center line of the hood at a point spaced by less than 500 mm from a windshield 11 of the vehicle. A light-receiving unit 2 is disposed in an occupant compartment of the vehicle 3 in opposite relationship to the light-emitting unit 1. In the illustrated embodiment of the invention, the light-receiving unti 2 is integral with a support stem of a rearview mirror 6 in the occupant compartment.

Figure 2:
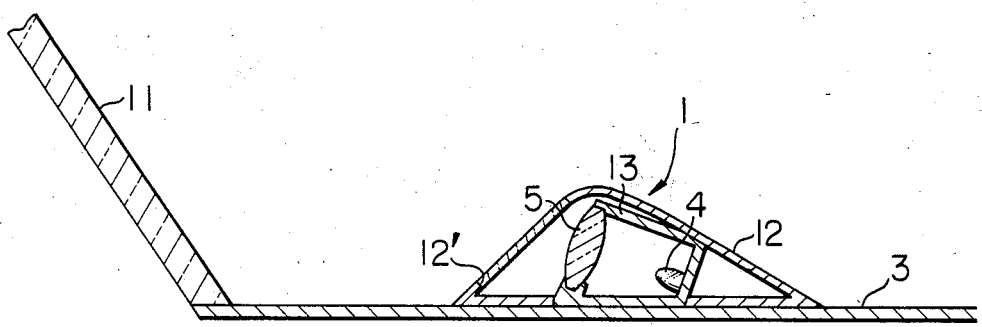
FIG. 2 is an enlarged sectional view of a light-emitting unit of the control apparatus shown in FIG. 1.

Referring to FIG. 2, the light-emitting unit 1 includes an outer casing 12 which is secured to the engine hood of the vehicle 3 by conventional securing means such as an adhesive or bolts, not shown, and accomodates an inner casing 13 which in turn accomodates an infrared emitting diode 4 (which is called hereunder "infrared LED"). A condensing lens 5 is disposed in front of the infrared LED 4 and held in position by the inner casing 13. The outer casing 12 is formed therein with an opening 12' disposed in optical alignment with the lens 5 and supports an infrared transmission filter 7 fixed to the inner peripheral edge of the opening 12'.

The light-emitting unit 1 is not limited to the structure shown and may alternatively be formed such that the infrared LED 4 is housed in another casing (not shown) remote from the outer and inner casings 12 and 13 and optically connected to the condensing lens 5 by an optical fiber tube (not shown) and a second condensing lens (not shown) housed in the other casing in front of the infrared LED. In such an alternative embodiment, the other casing can be installed under the engine hood and the optical fiber tube may extend through a small hole formed therein under the outer casing 13.

Figure 3:
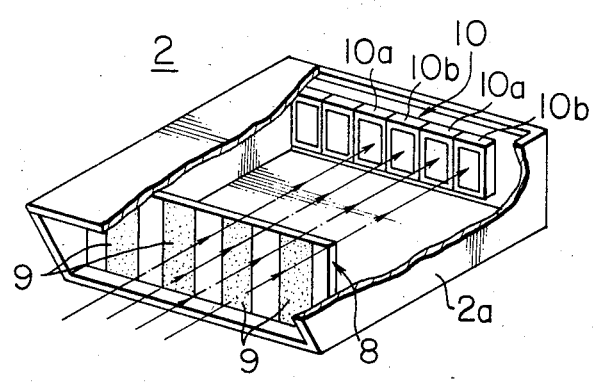
FIG. 3 is an enlarged perspective view of a light-receiving unit of the control apparatus with a part of the unit being cut away to show the inner structure thereof.

The light-receiving unit 2 is shown in detail in FIG. 3 and has a box-like hollow casing 2a having a front opening disposed in optical alignment with the light-emitting unit 1 so that the rays of the infrared beam emitted by the unit 1 pass through a predetermined area of the windshield 11 of the vehicle to the front opening of the casing 2a. The predetermined area of the windshield 11 is positioned within the zone of the windshield which is covered by the wiping operation of a windshield wiper blade 17 (see FIG. 1).

An infrared transmission filter 8 is mounted in the casing 2a of the light-receiving unit 2 adjacent to the front opening of the casing. The filter 8 is made from a material, such as a black acrylic resin, which provides an infrared transmissivity of about 80%. Thus, the filter 8 may be called "infrared transmission plate". The plate 8 carries a plurality of films of coatings 9 of an infrared shielding material printed in a striped pattern on the outer surface of the plate 8, the infrared shielding material consisting of a plastic coating material which includes an acrylic resin. The printed stripes of the infrared shielding coatings 9 are dark and dull, extend vertically and are arranged laterally or horizontally at intervals of about 3 mm. The material of the infrared shielding coatings 9 and the thickness thereof are selected to provide an infrared transmissivity of less than 0.1%.

Because of the described structure of the infrared transmission plate 8, the outer surface of the plate reflexes visible light little to improve the front view of the windshield 11 of the vehicle 3. In addition, the infrared transmission plate 8 acts as both an infrared filter plate and a masking or slit plate to advantageously reduce the number of component parts of the light-receiving unit 2, decrease the number of the steps of assemblying the component parts and lower the cost of manufacture of the light-receiving unit.

The striped infrared shielding films 9 may alternatively be formed by layers of a metal having a low surface reflectance. Such metallic layers can be formed by vacuum evaporation technique.

The casing 2a of the light-receiving unit 2 accomodates a photodetector assembly 10 spaced inwardly or rearwardly from the infrared transmission plate 8 and formed by a plurality of photodetectors 10a and a plurality of photodetectors 10b, the photodetectors 10a and 10b being alternately arranged laterally or horizontally in the casing 2a and secured to the rear end wall thereof. The photodetectors 10a are optically aligned with the uncoated areas of the infrared transmission plate 8 to detect the rays of the infrared beam which have passed through the uncoated areas, whereas the photodetectors 10b are optically aligned with the printed stripes of the infrared shielding coatings 9 on the plate 8 to detect the rays of the infrared beam which have passed through the infrared shielding coatings 9.

Figure 9:
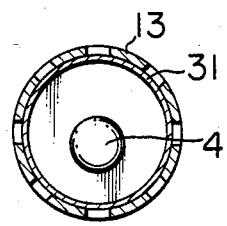
FIG. 9 is a cross-sectional view of the inner casing taken along line IX—IX in FIG. 8.

In the illustrated embodiment of the invention, the photodetectors 10a and 10b are respectively supported by individual mountings which in turn are secured to the rear wall of the casing 2a. However, the photodetectors 10a and 10b may alternatively be mounted on a common mounting (not shown) which in turn may be secured to the rear wall of the casing 2a. In addition, a cylindrical condensing lens (not shown) may be disposed within the casing 2a between the infrared transmission plate 8 and the photodetector assembly 10 to shorten the distance between the plate 8 and the assembly 10, as shown in FIG. 9 of the earlier application referred to above. Moreover, the arrangement of the optical paths of the infrared rays from the infrared transmission plate 8 to the photodetector assembly 10 is not limited to substantially horizontal and straight one, as illustrated, and may alternatively be vertical if a mirror (not shown) is disposed in front of the infrared transmission plate 8 at an angle to refect the infrared beam from the light-emitting unit 1 to the plate 8. Such a mirror may be either planar or concave.

The photodetector assembly 10 is electrically connected to a controlling circuit 15 mounted on a part of the vehicle body, as shown in FIG. 1. The controlling circuit 15 includes a lamp driver circuit 18 operative to electrically energize the infrared LED 4, a pair of amplifiers 19a and 19b respectively connected to the photodetectors 10a and 10b to amplify electric signals therefrom, and a first arithmetic circuit 20 in the form of a differential amplifier which is operative to compute the difference between the amplified signals from the ampifiers 19a and 19b. The difference is representative of the contrast between two groups of the infrared rays received by the photodetectors 10a and the photodetectors 10b. The output terminal of the arithmetic circuit 20 is connected to a peak hold circuit 21 and to a monitor circuit 22. The peak hold circuit 20 is operative to hold the maximum level of the contrast computed by the arithmetic circuit 20, while the monitor circuit 22 is in the form of an average detector operative to always monitor the contrast level computed by the arithmetic circuit 20. The output terminals of the peak hold circuit 21 and the monitor circuit 22 are connected to a second arithmetic circuit 23 in the form of a ratio detector operative to compute the ratio of the maximum contrast level to the average contrast level. The ratio thus computed by the circuit 23 represents the effect of the wiper operation, i.e., the extent to which the wiper blade 17 has removed raindrops from the predetermined area of the windshield during one cycle of the reciprocal movement of the wiper blade. The greater the ratio, the lower the extent, which means that the raindrops remain much on the windshield.

The second arithmetic circuit 23 has its output terminal connected to a comparator circuit 24 comprising four comparators 24a–24d which respectively receive reference voltages $R_1$–$R_4$ which have been respectively preset to provide (1) a high-speed wiper operation, (2) a low speed wiper operation, (3) an intermittent wiper operation at short intervals and (4) an intermittent wiper operation at long intervals. The outputs of the four comparator 24a–24d are connected to a logic circuit 25 comprising four NAND gates 25a–25d and being responsive to signals from the comparator circuit 24 to emit to a motor driver circuit 26 command signals respectively representative of the four modes of wiper operations (1) to (4) referred to above. The motor driver circuit 26 is responsive to the command signals from the logic circuit 25 to drive a wiper motor 16 in a selected mode of operation corresponding to the command signals. A reset circuit 27 receives a signal from the wiper motor 16 in each cycle of reciprocal wiping movements of the wiper blade 17 and emits a reset signal to the peak hold circuit 21 in each cycle of the wiper operation to cause the peak hold circuit to reset the maximum contrast level held therein. The operations of the respective electric circuits referred to above are described in detail in the earlier application referred to above and will not be discussed in detail herein.

In operation, when a wiper switch is turned on, the infrared LED 4 is electrically energized by the driver circuit 18 to emit infrared rays which are then condensed by the condensing lens 5 and directed through the windshield 11 to the light-receiving unit 2 in the occupant compartment of the vehicle 3. The infrared rays then pass through the striped shielding coatings 9 and the uncoated zones of the infrared transmission plate 8 to the photodetector assembly 10. The rays which have passed through the sheilding coatings 9 are received by the photodetectors 10b, whereas the rays which have passed through the uncoated zones of the infrared transmission plate 8 fall on the photodetectors 10a.

When no raindrops are present on the windshield 11, there is a clear or strong contrast between the rays received by the photodetectors 10a and the rays received by the photodetectors 10b. However, if raindrops are present on the windshield 11, the infrared rays are dispersed by the raindrops on the windshield when the rays pass therethrough, with the result that the contrast between the two groups of the infrared rays received by the photodetectors 10a and 10b is reduced or lowered. Thus, the difference between the electrical signals emitted by the photodetectors 10a and 10b is reduced accordingly.

The signals from the photodetectors 10a and 10b are respectively amplified by the amplifiers 19a and 19b and then fed into the first arithmetic circuit 20 which is operative to compute a difference between the amplified signals from the amplifiers 19a and 19b to produce a difference or contrast signal which is representative of the difference thus computed. The difference signal is then fed into the peak hold circuit 21 and the monitor circuit 22. It will be appreciated that, in rainy weather, the difference signal emitted by the first arithmetic circuit 20 is increased to the maximum level immediately after the wiper blade 17 has just wiped the predetermined area of the windshield 11 (through which the infrared beam from the light-emitting unit 1 passes to the light-receiving unit 2). The wiper blade 17 is then moved away from the predetermined area of the windshield to an end of it's wiping stroke, from which end the wiper blade is then moved back toward the predetermined area of the windshield 11. New raindrops fall on the windshield 11 and the quantity of the water on the predetermined area of the windshield is increased to the maximum quantity immediately before the wiper blade 17 wipes the predetermined area of the windshield during the return stroke of the wiper blade. Thus, the difference signal emitted by the first arithmetic circuit 20 is reduced to the minimum level at this moment.

As such, the difference signal from the first arithmetic circuit 20 is varied between the maximum and minimum levels during cyclical reciprocal movements of the wiper blade 17. The peak hold circuit 21 is operative to hold the maximum or peak level of the difference signal and emits a maximum level signal to the second arithmetic circuit 23. The peak level of the difference signal held in the peak hold circuit 21 will be erased by a reset signal received from the reset circuit 27 in each cycle of the wiper blade operation. In a succeeding cycle of the wiper blade operation, the peak hold circuit will hold a new peak level of the difference signal. Thus, the maximum level of the difference signal held by the peak hold circuit 21 is varied from one cycle of wiper blade operation to another cycle.

The monitor circuit 22 is operative to always monitor the difference signal from the first arithmetic circuit 20 and emits to second arithmetic circuit 23 a signal representative of the difference signal data monitored by the monitor circuit 22.

The second arithmetic circuit 23 computes a ratio of the output from the peak hold circuit 21 relative to the output from the monitor circuit 22, i.e., the ratio of the peak level data to the monitored signal data. The greater the data ratio, the greater the quantity of raindrops on the windshield, which means that the clearness of the driver's view through the windshield is lowered.

Because the peak level held by the peak hold circuit 21 is reset by a reset signal from the reset circuit 27 in each cycle of the wiper blade operation, the peak data fed into the second arithmetic circuit 23, i.e., the numerator of an arithmetic equation operated in the second arithmetic circuit 23, is changed in each cycle of wiper blade operation. For this reason, the arithmetic operation carried out in the second arithmetic circuit can be accorded to varying conditions such as deterioration of the light source and variation in the characteristics of the photodetector assembly 10, with the result that the operation of the windshield wiper can be free from such varying factors and can be controlled precisely in dependence on the quantity of raindrops on the windshield.

The second arithmetic circuit 23 emits to the comparator circuit 24 an output voltage signal which is in proportion to the reduction in the clearness of the driver's view through the windshield 11. The four comparators 24a–24d are supplied with different references voltages $R_1$–$R_4$ with which the input to the circuit 24 is compared, so that the comparators 24a–24d selectively emit output signals dependent upon the voltage level of the signal from the circuit 23. For example, when the voltage level applied to the comparator circuit 24 is higher than the highest reference voltage, all of the four comparators 24a–24d emit output signals of a logic level "1". When the voltage level applied to the comparator circuit 24 is of a second highest level, three comparators will emit output signals of a logic "1". When the input to the comparator circuit 24 is of a third highest reference voltage, two comparators will emit output signals of logic "1" and, when the input voltage applied to the circuit is of the lowest level, only one comparator will produce an output signal of logic "1".

The output signals emitted by the comparators 24a–24d are applied to the logic circuit 25. When the signals from these four comparators are all of logic "1", the logic circuit 25 applies to the motor driver circuit 26 a signal which commands the circuit 26 to drive the wiper motor 16 at a high speed. When three signals from the comparator circuit 24 are of logic "1", the logic circuit 25 emits to the motor driver 26 a signal which commands the driver 26 to drive the wiper motor 16 at a low speed. When two signals from the comparator circuit 24 are of logic "1", the motor driver 26 receives a command signal by which the driver 26 is caused to drive the wiper motor 16 intermittently at short intervals and, when only one signal from the comparator circuit 24 is logic "1", the logic circuit 25 emits a signal to the motor driver 26 to cause the same to drive the wiper motor 16 intermittently at long intervals. Thus, the wiper blade 17 is driven to perform wiping operation in selected one of the aforementioned four modes to remove or wipe raindrops away from the driver's view through the windshield 11.

As described above, the windshield wiper control apparatus is operative to automatically select the speed of the wiper operation and the intervals of cyclical reciprocal movement of the wiper blade to save the driver troublesome wiper switch operations.

Figure 5:
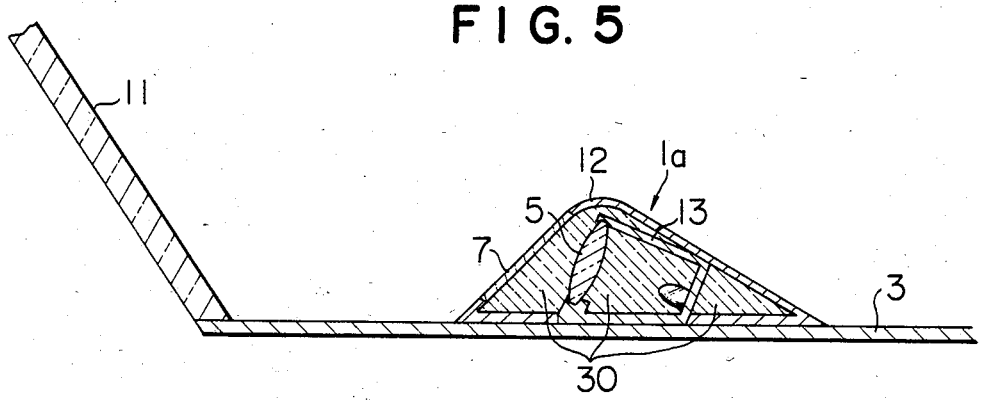
FIG. 5 is similar to FIG. 2 but illustrates a modified light-emitting unit.
Figure 6:
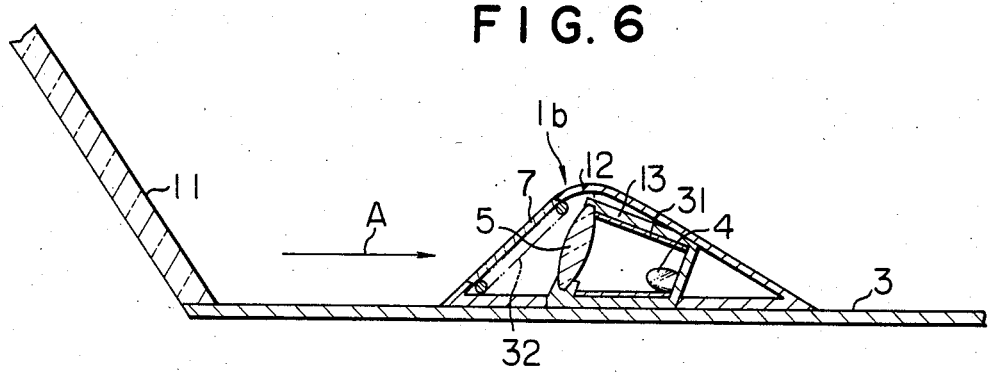
FIG. 6 is similar to FIGS. 2 and 5 but illustrates a further modified light-emitting unit.
Figure 7:
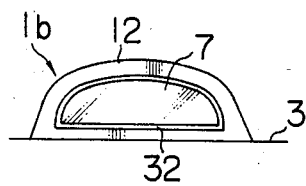
FIG. 7 is a view of the further modified light-emitting unit as taken in a direction indicated by an arrow A in FIG. 6.
Figure 8:
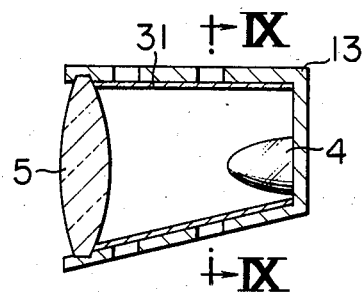
FIG. 8 is a generally horizontal partial sectional view of an inner casing of the further modified light-emitting unit shown in FIGS. 6 and 7.

FIG. 5 shows a light-emitting unit 1a which is slightly modified from the light-emitting unit 1 described above. The modification comprises a mass of an optically transparent resin 30, such as a photohardnable or light-setting plastic material, which fills up the spaces bewteen the outer and inner casings 12 and 13 and between the inner casing 13 and the infrared LED 4 to securely hold these members and the infrared filter 7 together so that the axis of the infrared beam emitted by the light-emitting unit 1a toward the light-receiving unit 2 is prevented from being unduly deviated from a predetermined path of the infrared beam due to vibration of the body of the vehicle during operation thereof. Thus, the structure of the modified light-emitting unit 1a contributes to an improvement in precise detection of raindrops on the windshield.

FIGS. 6 to 9 illustrate a further modified light-emitting unit 1b in which the inner casing 13 is generally frusto-conical and has a perforated peripheral wall which is provided with an inner lining 31 of a water-absorbing fibrous material. An electric heater 32 formed by a heat-generating conductor is disposed within the outer casing 12 adjacent to the periphery of the infrared filter 7 and adapted to be intermittently energized by a conventional electric circuit (not shown) which is adapted to be electrically connected to a power source (not shown) by a manually operable switch (not shown). The structure of the modified light-emitting unit 1b is advantageous in that any water drops if present between the inner and outer casings 13 and 12 is absorbed by the fibrous inner lining 31 and thus is prevented from entering the inner casing, that water moisture if present within the inner casing 13 is allowed to pass the inner lining 31 into the outer casing 12, that the perforations in the peripheral wall of the inner casing 13 are effective to communicate the interior of the inner casing with the space between the inner and outer casings whereby the interior and exterior of the inner casing 13 are kept at substantially equal temperature level to prevent the occurence of dew condensation on the condensing lens 5, and that the intermittent operation of the electric heater 32 is effective to prevent the occurence of dew condensation on the infrared filter 7.

Figure 10:
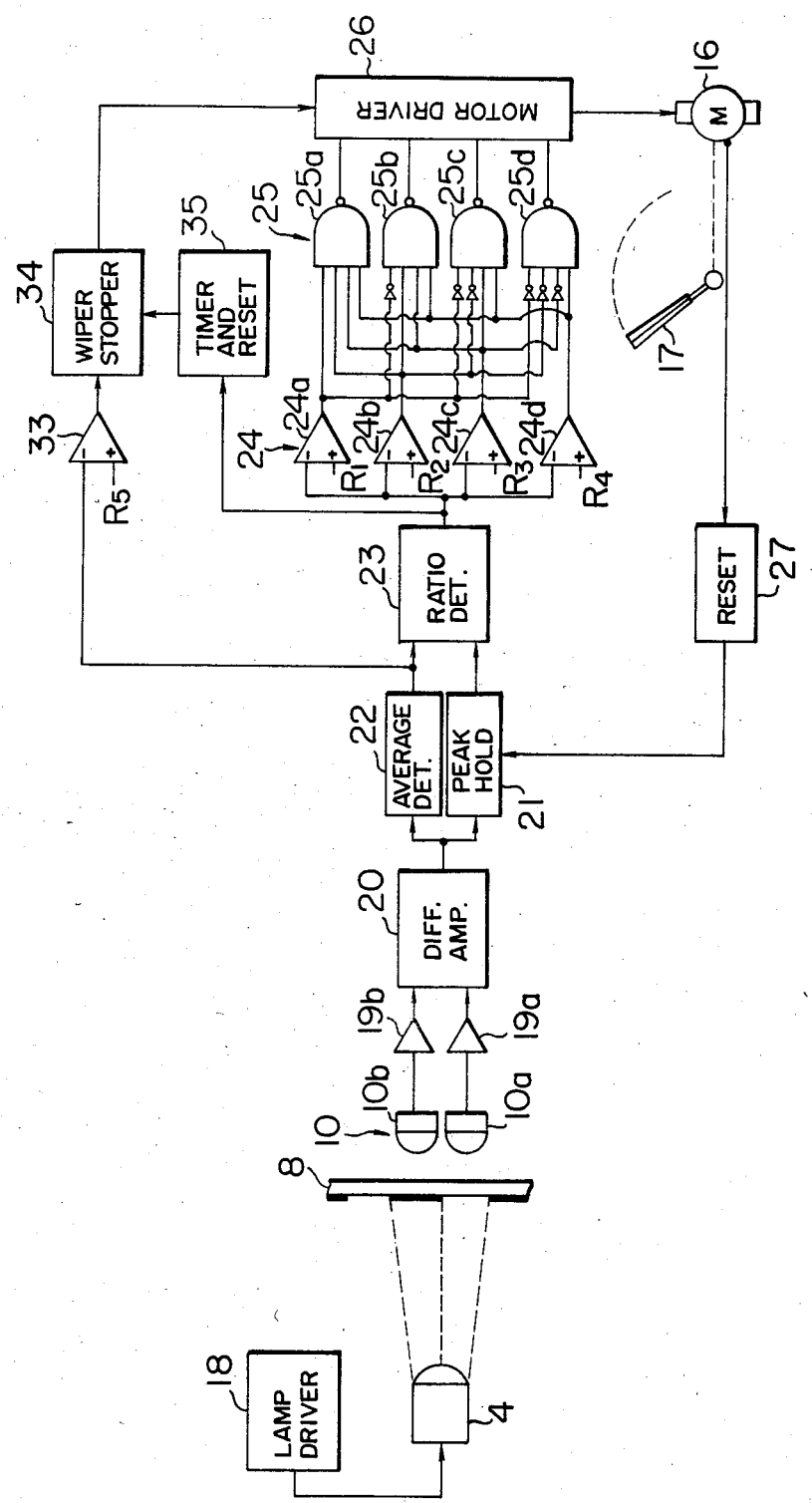
FIG. 10 is a block diagram of a modified electric circuitry employed in another embodiment of the windshield wiper control apparatus.

A modification to the electric circuitry shown in FIG. 4 is illustrated in FIG. 10 wherein the parts the same as those shown in FIG. 4 are designated by the same reference numerals. The modification comprises means for automatically stopping and restarting the wiper operation during washing of the vehicle body. The wiper stopping and restarting means include a fifth comparator 33 electrically connected to the output of the monitor circuit 22 to compare the monitored difference or contrast signal data from the monitor circuit 22 with a reference voltage $R_5$. When the contrast signal data is less than the reference voltage $R_5$, which means that the passage of the infrared beam from the light-emitting unit 1 to the light-receiving unit 2 is obstructed by a car washing brush which is in operation to wash the vehicle body, the comparator 33 emits an output signal commanding the wiper operation to be stopped. A wiper stopper circuit 34 is responsive to this command signal to emit to the motor driver circuit 26 a signal instructing the circuit to stop the wiper motor at its predetermined stop position. A timer and reset circuit 35 is connected to the second arithmetic circuit 23. When the car washing brush has been moved past the wiping zone of the windshield 11 of the vehicle and the contrast level ratio computed by the circuit 23 has been increased beyond a predetermined value, the timer starts its operation and, after the lapse of a predetermined time period, emits a reset signal to the wiper stopper circuit 34 to cancel the command signal which has been continuously emitted by the wiper stopper circuit to keep the wiper motor 16 stopped. Thus, the wiper operation is restarted after the car washing brush has surely been moved past the area of the windshield which is wiped by the windshield wiper blade 17.

Figure 11:
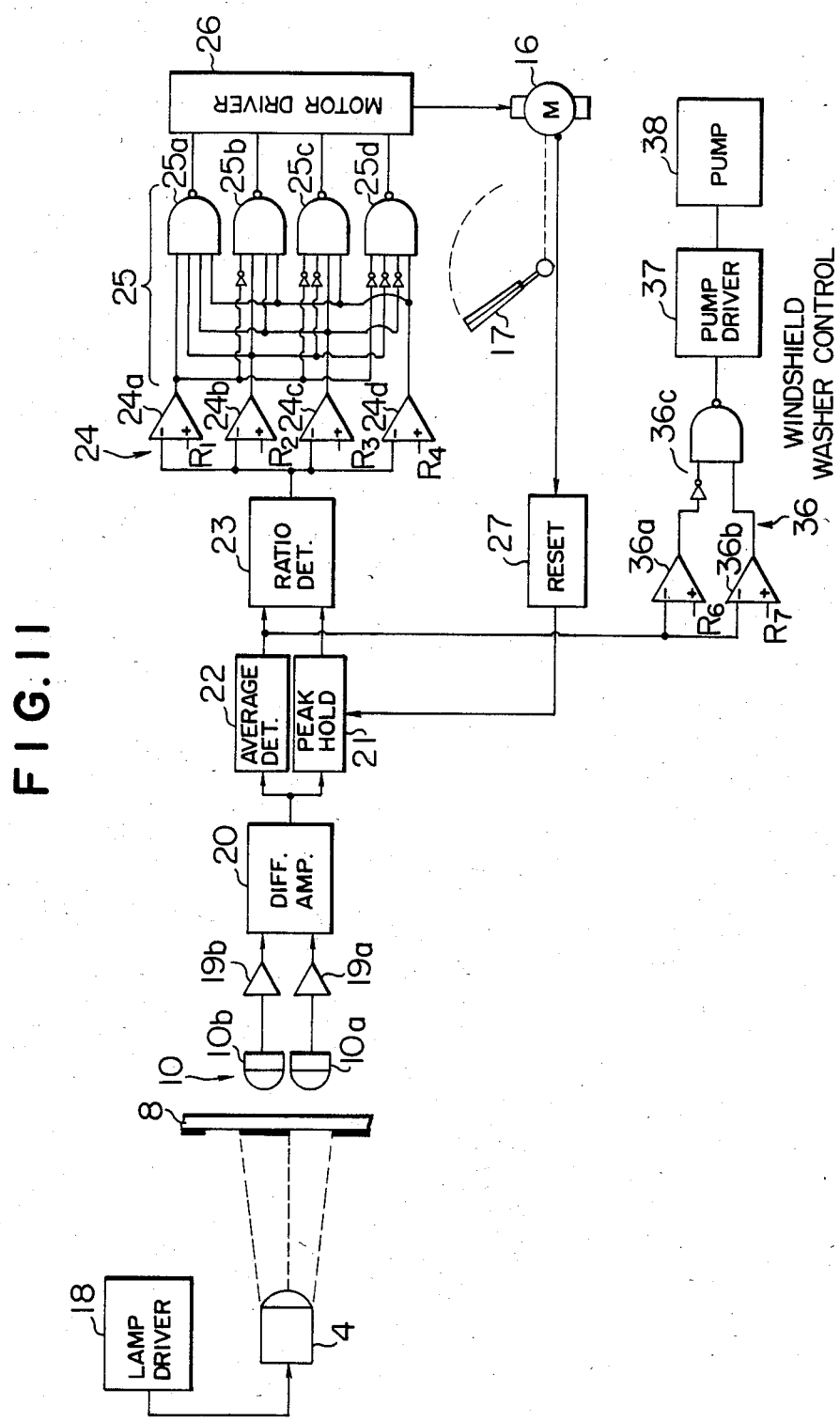
FIG. 11 is a block diagram of a further modified electric circuitry employed in a further embodiment of the windshield wiper control apparatus.

Another modification to the electric circuitry shown in FIG. 4 is shown in FIG. 11 in which the parts the same as those shown in FIG. 4 are designated by the same reference numerals. The modification comprises means for detecting a condition where dirt and other dirty matters are adhered to and dried on the windshield and unable to be wiped away solely by the wiper operation. The detecting means include a windshield washer control means 36 comprising two comparators 36a and 36b and a logic section 36c. The comparators 36a and 36b are connected to the output of the monitor circuit 22 to compare the monitored contrast level from the monitor circuit with reference voltages $R_6$ and $R_7$ and emit outputs to the logic section 36c. The arrangement is such that, when the contrast level thus compared with the reference voltages $R_6$ and $R_7$ falls within an intermediate range, the logic section 36c emits a command signal which is amplfied by a washer pump driver circuit 37 to which a windshield washer pump 38 is connected so as to be driven by the amplified command signal. The intermediate range is determined to represent the state where the wiper motor 16 and the windshield washer motor 38 are both required to be energized to remove the dirt and other dirty matters adhered to the windshield.

What is claimed is:

1. A windshield wiper control apparatus for use on a vehicle having an occupant compartment with a windshield and a windshield wiper device having a wiper blade movable across a predetermined area of the windshield, comprising:

a first unit adapted to be mounted on the vehicle outside said occupant compartment for emitting an infrared beam to and through said predetermined area of the windshield into said occupant compartment;

a second unit adapted to be mounted on the vehicle in said occupant compartment for receiving rays of the infrared beam from said first unit through said predetermined area of said windshield; and means for automatically controlling the wiper operation in dependence on the state in which the infrared rays are received by said second unit;

said second unit including an infrared transmission plate carrying infrared shielding layers applied to at least one of the two surfaces of said plate and photodetector means disposed rearwardly of said infrared transmission plate as viewed in the direction of the passage of the infrared beam, said infrared transmission plate being formed of a material capable of transmitting infrared rays, said infrared shielding layers being formed from a material capable of substantially obstructing the passage of infrared rays therethrough whereby a contrast is produced on said photodetector means by the infrared rays which have passed through the zones of said infrared transmission plate which are free from said infrared shielding layers, the contrast being varied with the variation in the quantity of raindrops on said predetermined area of said windshield, said controlling means being responsive to the variation in the contrast to control the operation of the wiper blade, wherein said first unit comprises an outer casing, an inner casing having a perforated wall, a light-emitting element in said inner casing, a lens disposed at an open end of said inner casing, said perforated wall of said inner casing having a lining of a water-absorbing material extending over the perforated surface of said inner casing wall, said outer casing having a portion disposed in optical alignment with said lens and capable of transmitting the light emitted by said light-emitting element and coming from said lens, and heating means operable to heat said light transmitting portion of said outer casing.

2. A windshield wiper control apparatus according to claim 1, wherein said light transmitting portion of said outer casing comprises an infrared filter supported by said outer casing and wherein said heating means comprises an electric conductor disposed inside said outer casing and adjacent to a peripheral edge of said infrared filter.

3. A windshield wiper control apparatus according to claim 1, wherein said infrared transmission plate is formed of a plastic material having an infrared transmissivity of about 80% and the material of said infrared shielding layers and the thickness thereof are selected to provide an infrared transmissivity of less than 0.1%.

* * * * *